Figure 1:
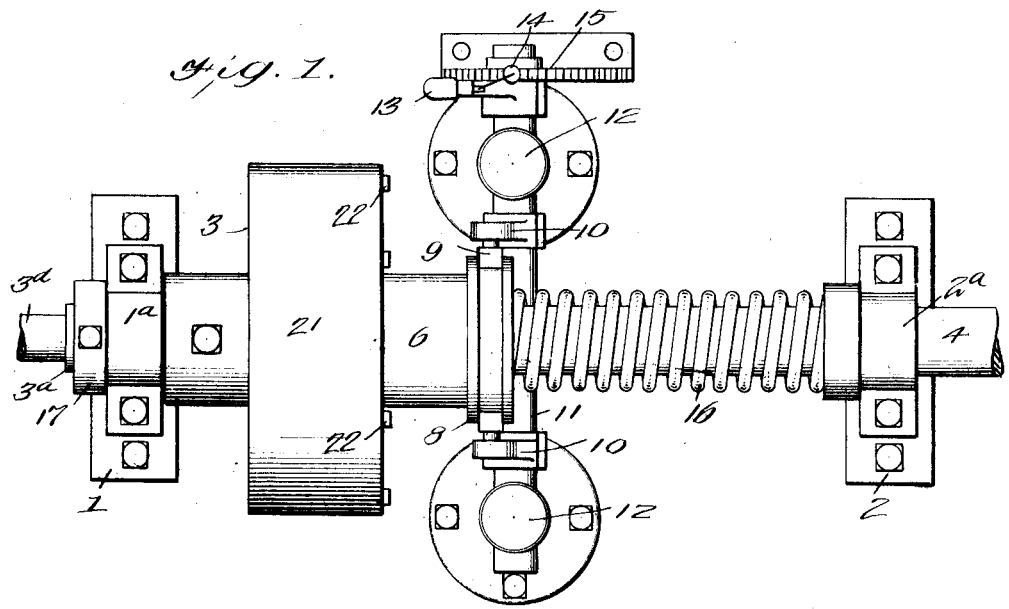

E. J. SWEET.
CLUTCH.
APPLICATION FILED MAY 28, 1912.

1,065,635.

Patented June 24, 1913.

2 SHEETS—SHEET 1.

WITNESSES
H. C. Barry
L. A. Stanley

INVENTOR
Edward J. Sweet
BY Munn & Co.
ATTORNEYS

E. J. SWEET.
CLUTCH.
APPLICATION FILED MAY 28, 1912.
1,065,635.
Patented June 24, 1913.
2 SHEETS—SHEET 2.
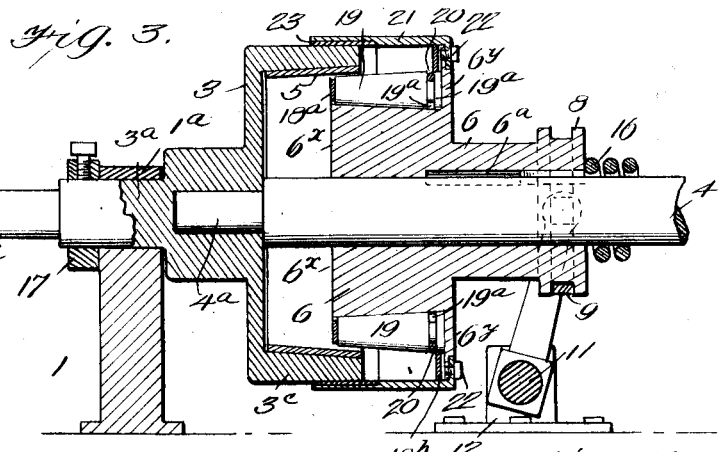
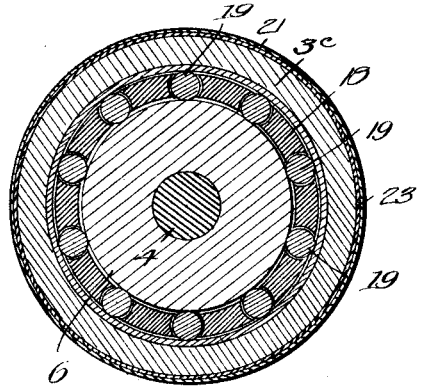
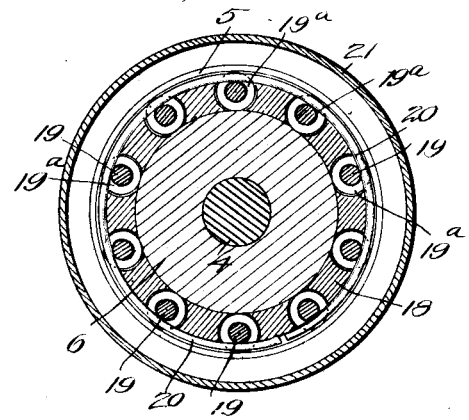
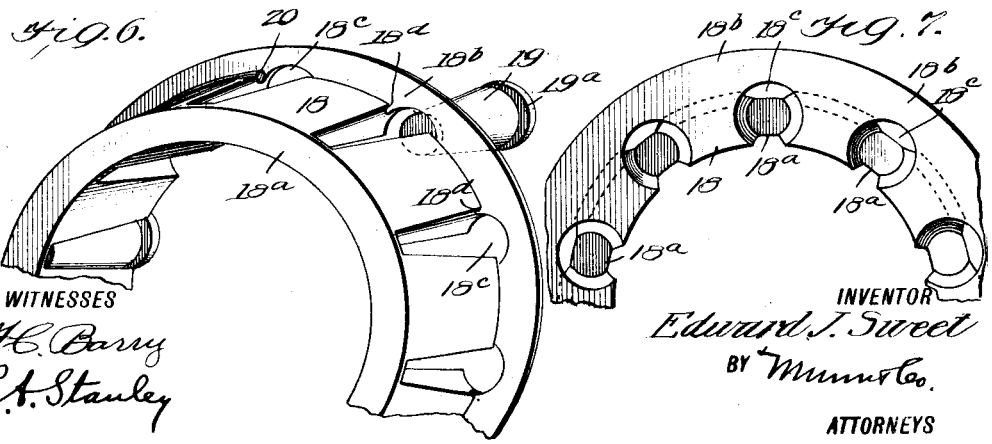
WITNESSES
H. C. Barry
L. A. Stanley
INVENTOR
Edward J. Sweet
BY Munn & Co.
ATTORNEYS

UNITED STATES PATENT OFFICE.

EDWARD J. SWEET, OF TAMPA, FLORIDA, ASSIGNOR, BY DIRECT AND MESNE ASSIGNMENTS, OF THREE-TWELFTHS TO WALTER T. JAIMESON, OF TAMPA, FLORIDA, AND TWO-TWELFTHS TO T. ED. BRYAN AND TWO-TWELFTHS TO J. H. BONACKER AND W. A. BONACKER, THE LAST TWO BEING COPARTNERS UNDER THE FIRM-NAME OF BONACKER BROTHERS, OF HILLSBORO COUNTY, FLORIDA.

CLUTCH.

1,065,635.     Specification of Letters Patent.     Patented June 24, 1913.

Application filed May 28, 1912. Serial No. 700,149.

*To all whom it may concern:*

Be it known that I, EDWARD J. SWEET, a citizen of the United States, and a resident of Tampa, in the county of Hillsboro and State of Florida, have invented a new and useful Improvement in Clutches, of which the following is a specification.

My invention relates to improvements in clutches, especially those designed for use in automobiles, and it consists in the combinations, constructions and arrangements herein described and claimed.

An object of my invention is to provide a clutch having detachable bearing members which may be quickly removed and replaced when worn.

A further object of my invention is to provide a clutch in which the frictional engagement of the main clutch members increases from a minimum to a maximum when the clutch members are being brought together and decreases in a similar manner when they are being drawn apart, as contra-distinguished from those clutches in which there is a sudden engagement of one clutch member with the other. This is brought about by means of certain bearing members which serve as rollers when the clutch members are first brought into engagement, but which are subsequently locked in position and serve as wedge members for holding the clutch members together.

A further object of my invention is to provide a clutch which will automatically free itself when force is applied to cause the release of the engaging members.

A further object of my invention is to provide a novel means for holding the bearing members.

Other objects and advantages will appear in the following specification, and the novel features of the device will be particularly pointed out in the appended claims.

My invention is illustrated in the accompanying drawings forming part of this specification, in which similar reference characters indicate like parts in the several views, and in which—

Figure 2:
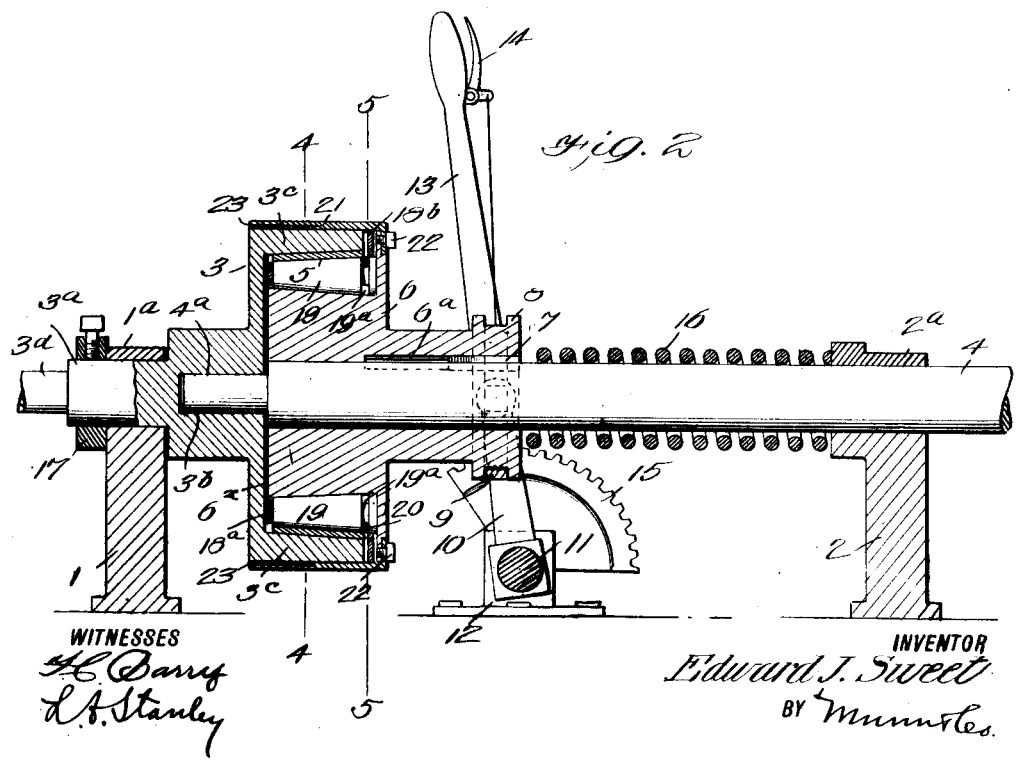

Figure 1 is a plan view of the device. Fig. 2 is a longitudinal section showing the clutch members together; Fig. 3 is a section through the clutch showing the clutch members forced apart; Fig. 4 is a sectional view along the line 4—4 of Fig. 2; Fig. 5 is a sectional view along the line 5—5 of Fig. 2; Fig. 6 is a perspective view of a portion of the roller frame; and Fig. 7 is an end view of the roller frame.

In carrying out my invention I provide a pair of supports 1 and 2, the former having a bearing 1$^a$ for the reduced portion 3$^a$ of the clutch member 3, and the latter having a similar bearing 2$^a$ for the shaft 4. The clutch member 3, as will be seen from Figs. 2 and 3, is provided with a central recess or bore 3$^b$ arranged to receive the reduced end portion 4$^a$ of the shaft 4. The clutch member 3 is also provided with a recess for receiving the companion clutch member, this recess tapering from the outer to the inner end so as to provide inwardly tapering walls 3$^c$. Disposed in the recess in the clutch member 3 is a wear resisting bushing 5. The companion clutch member consists of a body portion 6 which is provided with a central bore arranged to receive the shaft 4. A keyway 6$^a$ is provided in the body portion 6 while a feather or key 7 permits the member 6 to slide longitudinally of the shaft. An integral grooved collar 8 is provided in which is a semi-circular yoke 9, the latter being mounted on arms 10 attached to a rock-shaft 11 carried by uprights 12. (See Fig. 1.) To one end of the rock-shaft is a lever 13 having a locking device 14 arranged to engage a locking segment 15 for holding the clutch in its shifted position. A strong spiral spring 16 bears at one end against the upright 2, and at the other end against the collar 8. A collar 17 is provided for the reduced portion 3$^d$ for holding the clutch member 3 in position.

In Fig. 6 I have shown a casing which is arranged to fit over the main body portion 6 of one of the clutch members. This casing consists of a tapered body portion 18 having a flange 18$^a$ at one end and a flange 18$^b$ at the other. Around the periphery of the body portion and spaced at equal distances are tapering bores 18$^c$ arranged to receive the tapering rollers 19. These bores extend in from the flange 18$^b$, but terminate short of the flange 18$^a$. The bores 18$^c$ are somewhat larger both in diameter and in length than the rollers 19. The bores form in fact slots through which the sides of the rollers project. It will be observed that adjacent to the flange 18$^b$ is a groove 18$^d$ in which an expansion ring or wire 20 is held. This wire or ring 20 is also arranged to enter a groove 19$^a$ of each of the rollers 19 so as to lock the rollers in the casing 18.

In order to place the casing 18 on the member 6, it is best to hold the member 6 with the face 6$^x$ upright, and to place the rollers 19 around the body portion 6 in the manner shown in Fig. 4, so that the rollers register with the bores. The casing may then be slipped over the rollers and the expansion ring may be sprung into position when the grooves 18$^d$ and 19$^a$ are in alinement. This locks the casing with the rollers upon the tapered member 6.

In order to make the clutch dust-proof, I provide an exterior flange 21 which may be secured to the flanged portion 6$^y$ of the member 6 in any suitable manner as by the screws 22. This flange or exterior casing is recessed where it overlaps the companion clutch member 3 and is provided with a strip of fabric 23, such as felt or similar material which will press against the member 3 and will tend to exclude the dust.

From the foregoing description of the various parts, the operation thereof may be readily understood. The spring 16 holds the member 6 and the casing bearing the rollers 19 so that the latter are forced against the bearing surface 5 of the companion clutch member 3. This wedges the rollers between the member 6 and the bearing bushing 5 in such a manner as to cause the two clutch members to grip tightly. If the member 4 is the driving shaft, the shaft 3$^d$ will therefore rotate with the shaft 4. When it is desired to release the clutch the lever 13 is swung so as to force the member 6 away from the member 3. Owing to the fact that the member 6 is tapered with a reverse taper to that of the bearing bushing 5, the rollers 19 will be immediately forced out of engagement with the bearing bushing 5 while a further movement of the lever will entirely clear them from the latter. The clutch members will therefore run free. When the lever 13 is released, the spring 16 will tend to force the member 6 back into position. When the rollers first engage the bearing bushing 5 they will rotate in the bores, but under continued action of the spring this rotation will soon cease because the rollers will be forced into further contact with the bearing bushing 5 in precisely the same manner as where one forces the tapered shank of a tool into its tapered socket by giving it a twist and a thrust. It will be observed that while this action takes place in a very short time, it is not accomplished instantly, but there is an actual rotation of the rollers at first until the latter have had time to wedge themselves against the bearing member. The effect of this is to gradually bring the parts together. In other words, when the lever is first released the clutch member 6 bearing the rollers 19 will actually rotate with respect to the clutch member 3, especially if there is a heavy load on 3 although the wedging action is increasing all the time when finally both parts will rotate together. It is this feature to which I desire to call particular attention since in practice I have found it to be very advantageous in that it does not cause the jar and rack which would occur if both of the clutch members were locked instantly. The wear comes largely upon the bearing 5 and upon the rollers 19. The latter of course can be easily removed by taking off the wire and lifting the casing 18 directly from the body portion 6, when the rollers can be replaced.

The provision of the outer casing 21 with its resilient covering prevents dust and dirt from going into the clutch, and practically makes the latter dust-proof.

I claim:—

1. In a friction clutch, a pair of main clutch members, one of said members having a tapered recess, a plurality of tapered rollers carried by the other clutch member and arranged to engage the tapered walls of the recess of the first-named clutch member for frictionally holding said clutch members together.

2. In a friction clutch, a pair of main clutch members, one of said members being provided with a tapered recess, the other clutch member having a tapered body portion, an annular casing arranged to fit over the tapered body portion of the second-named clutch member, and a series of tapered rollers carried by said casing and arranged to engage the tapered walls of said first-named clutch member.

3. In a friction clutch, a pair of main clutch members, one of said clutch members having a tapered recess, the other clutch member having a tapered body portion, an annular casing arranged to fit over said tapered body portion and being provided with a series of tapered bores, and tapered rollers carried within the bores of said casing and arranged to engage the tapered walls of the recess of the first-named clutch member.

4. In a friction clutch, a pair of main clutch members, one of said clutch members having a tapered recess, the other clutch member having a tapered body portion, an annular casing arranged to fit over said tapered body portion and being provided with a series of tapered bores, tapered rollers carried within the bores and arranged to engage the walls of the tapered recess of the first-named clutch member, and means for locking the casing upon the tapered body portion of the second-named clutch member.

5. In a friction clutch, a pair of main clutch members, one of said clutch members having a tapered recess, the other clutch member having a tapered body portion, an annular casing arranged to fit over said tapered body portion and being provided with a series of tapered bores, said casing being also provided with a circumferential groove, a plurality of tapered rollers carried in the bores in said casing, each roller having a groove arranged to register with the peripheral groove in said casing, said rollers being arranged to engage the walls of the tapered recess in said first-named clutch member, and an expansion ring arranged to enter the registering grooves of said casing and said rollers.

6. In a friction clutch, a pair of main clutch members, one of said clutch members having a tapered recess, the other clutch member having a tapered body portion, an annular casing arranged to fit over said tapered body portion and being provided with a series of tapered bores, said casing being also provided with a circumferential groove, a plurality of tapered rollers carried in the bores in said casing, each roller having a groove arranged to register with the peripheral groove in said casing, said rollers being arranged to engage the walls of the tapered recess in said first-named clutch member, an expansion ring arranged to enter the registering grooves of said casing and said rollers, an annular flange carried by said second-named clutch member and arranged to fit over said first-named clutch member, and a resilient strip carried by said annular flange and arranged to bear on said first-named clutch member.

EDWARD J. SWEET.

Witnesses:
L. S. STANLEY,
SOLON C. KEMON.